(12) United States Patent
Zimmerman

(10) Patent No.: US 6,673,873 B1
(45) Date of Patent: Jan. 6, 2004

(54) ELECTROSTATIC-DISSIPATIVE MULTIPOLYMER COMPOSITIONS

(75) Inventor: Daniel Zimmerman, Stratford, CT (US)

(73) Assignee: Cyro Industries, Rockaway, NJ (US)

( * ) Notice: Subject to any disclaimer, the term of this patent is extended or adjusted under 35 U.S.C. 154(b) by 0 days.

(21) Appl. No.: 09/382,870

(22) Filed: Aug. 25, 1999

(51) Int. Cl.$^7$ .................. C08L 77/12; C08F 283/04
(52) U.S. Cl. ................. 525/420; 525/66; 525/77; 525/92 A; 525/166; 525/412; 525/426; 525/434; 525/437; 524/555; 524/556; 524/560
(58) Field of Search ................. 525/66, 92 A, 525/77, 79, 166, 434, 412, 426, 420, 437; 524/555, 556, 560

(56) References Cited

U.S. PATENT DOCUMENTS

| | | | |
|---|---|---|---|
| 3,261,887 A | 7/1966 | Mann | 260/876 |
| 3,354,238 A | 11/1967 | Schmitt et al. | 260/876 |
| 4,085,166 A | 4/1978 | DiLeone et al. | 260/876 R |
| 4,179,479 A | 12/1979 | Carter, Jr. | 525/66 |
| 4,228,256 A | 10/1980 | Schmitt | 525/302 |
| 4,242,469 A | 12/1980 | Schmitt et al. | 525/71 |
| 4,376,856 A | 3/1983 | Tanaka et al. | 525/419 |
| 4,438,240 A | 3/1984 | Tanaka et al. | 525/420 |
| 4,536,530 A | 8/1985 | Barlow et al. | 524/109 |
| 4,689,393 A | 8/1987 | Liedloff | 528/283 |
| 4,775,716 A | 10/1988 | Kipouras et al. | 525/64 |
| 5,061,747 A | 10/1991 | Roach et al. | 524/379 |
| 5,096,995 A | 3/1992 | Fukumoto et al. | 528/125 |
| 5,159,053 A | 10/1992 | Kolycheck et al. | 528/76 |
| 5,169,899 A | * 12/1992 | Uehara et al. | 525/66 |
| 5,290,860 A | 3/1994 | Zimmerman et al. | 525/67 |
| 5,298,558 A | 3/1994 | Sullivan et al. | 525/66 |
| 5,331,061 A | 7/1994 | Liedloff | 525/425 |
| 5,338,795 A | * 8/1994 | Fukumoto et al. | 525/66 |
| 5,338,797 A | * 8/1994 | Peascoe et al. | 525/66 |
| 5,604,284 A | 2/1997 | Ueda et al. | 524/434 |
| 5,652,326 A | 7/1997 | Ueda et al. | 528/288 |
| 5,834,561 A | * 11/1998 | Fukumoto et al. | 525/66 |
| 5,886,097 A | * 3/1999 | Fukumoto et al. | 525/66 |
| 5,886,098 A | 3/1999 | Ueda et al. | 525/66 |
| 6,072,001 A | * 6/2000 | Wang et al. | 525/66 |
| 6,084,028 A | * 7/2000 | Someda et al. | 525/66 |

FOREIGN PATENT DOCUMENTS

| | | |
|---|---|---|
| EP | 0 303 489 A | 2/1989 |
| EP | 0596704 | 5/1994 |
| EP | 0 613 919 A | 9/1994 |
| WO | WO9514058 | 5/1995 |

OTHER PUBLICATIONS

XP002149087 & JP 02 283748A; Derwent Publications Ltd., (Asahi Chem Ind Co LTD) Nov. 21, 1990.
XP002149088 & JP 04 236255 A; Derwent Publications Ltd., (Mitsubishi Rayon Co LTD) Aug. 25, 1992.
XP002149089 & JP 04 252256 A; Derwent Publications Ltd., (Mitsubishi Rayon Co LTD) Sep. 8, 1992.
XP002149090 & JP 06 100747 A; Derwent Publications Ltd., (Asahi Kasei Kogyo KK) Apr. 12, 1994.
XP002149083, Derwent Publications Ltd., & JP 08 085729 A (Asahi Kasei Kogyo KK) Apr. 2, 1996.
XP002149084, Derwent Publications Ltd., & JP 08 048768 A (Sanyo Chem Ind LTD) Feb. 20, 1996.
XP002149085, Derwent Publications Ltd., & JP 01 090246 A (Nippon Oils & Fats Co LTD) Apr. 6, 1989.
XP002149086, Derwent Publications Ltd., & JP 02 263863 A (Toray Ind INC) Oct. 26, 1990.
XP002149103, Derwent Publications Ltd., & JP 03 039349 A (Asahi Chemical Ind KK) Feb. 20, 1991.

* cited by examiner

*Primary Examiner*—P. Hampton-Hightower
(74) *Attorney, Agent, or Firm*—Klauber & Jackson

(57) ABSTRACT

A substantially transparent, moldable, thermoplastic multipolymer composition comprising a methyl methacrylate copolymer containing a predominant amount of methyl methacrylate and a minor amount of one or more ethylenically unsaturated monomers; and an effective amount of a polyetheresteramide to enhance the electrostatic charge dissipation of the copolymer. The polyetheresteramide has a refractive index within about 0.005 units of the refractive index of the copolymer. The composition, when subjected to injection molding, is such that the injection-molded composition exhibits a haze of not greater than about 25% and a light transmission of at least about 60%. Preferably, the composition includes an impact modifier which also has a refractive index within about 0.005 units of the refractive index of the copolymer. The composition may also include a minor amount of a polyethylene glycol having a weight average molecular weight of about 2,000 to about 10,000.

43 Claims, No Drawings

ELECTROSTATIC-DISSIPATIVE MULTIPOLYMER COMPOSITIONS

FIELD OF THE INVENTION

The invention relates to moldable, thermoplastic multipolymer blends of an acrylic-based copolymer and a polyetheresteramide which exhibits good transparency, good chemical resistance and the enhanced dissipation of electrostatic charge.

BACKGROUND OF THE INVENTION

Transparent plastic compositions are useful for a number of applications including components for electronic and scientific equipment, point of purchase displays, packaging containers, etc., since they permit visual inspection of the items housed within the plastic. Such transparent plastic compositions are especially useful for the packaging of electronic components such as magnetic head assemblies and clean room applications. In addition, it is often desirable that the packages be reusable after cleaning. However, such transparent plastic materials typically have low conductivity and, as a result, tend to accumulate static electrical charges during their manufacture and use. Such static electrical charges may cause dust or other particles to adhere to the plastic material or even cause the plastic material to adhere to itself or other articles. Further, such static charges may also lead to functional damage in the performance of highly sensitive electronic components.

Accordingly, there is a need for substantially transparent moldable, thermoplastic multipolymer compositions which prevent the buildup of static electrical charges and can dissipate such charges in order to avoid the disadvantages of prior art compositions.

Electrostatic-dissipative multipolymer blends are known in the prior art. For example, U.S. Pat. No. 5,298,558 discloses a blend of polyvinyl chloride, a small amount of an impact modifier polymer such as ABS graft copolymer and an electrostatic dissipative amount of a chain-extended polyether. U.S. Pat. No. 4,775,716 discloses an antistatic thermoplastic composition of an ABS graft copolymer and an electrostatic dissipative composition comprising a copolymer of an epihalohydrin and an oxirane-containing comonomer.

EP 0 596 704 discloses electrostatic-dissipative polymer blends of a styrenic polymer such as ABS or MABS, an epihalohydrin copolymer and a polyalkylenelactone. WO 95/14058 discloses an antistatic thermoplastic composition comprising a MABS copolymer and an inherently antistatic thermoplastic urethane copolymer. Other prior art which mention the use of polyurethanes to confer electrostatic-dissipative properties on thermoplastic polymers include U.S. Pat. Nos. 5,159,053 and 4,179,479.

It is well known that when blending two polymers which are incompatible, the blend will contain large particles or "islands" of one polymer (the minor component) imbedded in the other polymer (the major component) with very little adhesion between the two polymers. This results in undesirable physical properties with the blend often exhibiting the worst properties of both components. It is well known that the use of a compatibilizer, i.e., a "bridge," allows the components to accept each other, thereby resulting in much smaller particles on the minor component, with good adhesion occurring between the two components, thus allowing stress transfer and hence better physical properties.

In the present invention, no compatibilizer is required because there is good inherent compatibility between the methyl methacrylate copolymer and the polyetheresteramide. This is readily seen from the data presented below in Table III in respect to the elongation @ break which is a measure of the toughness of the blend; the data below shows a comparison of the elongation @ break for a blend of a standard grade of a polymer of methyl methacrylate containing a small amount of methyl acrylate comonomer blended with a polyetheresteramide vs. a blend of the methyl methacrylate copolymer and the polyetheresteramide of the present invention.

SUMMARY OF THE INVENTION

In accordance with a first aspect of the invention, there is provided a substantially transparent, moldable, thermoplastic multipolymer composition comprising a blend of (a) a methyl methacrylate copolymer and (b) an effective amount of a polyetheresteramide to enhance the electrostatic charge dissipation of the copolymer, said polyetheresteramide having a refractive index within about 0.005 units of the refractive index of the copolymer. In a more preferred embodiment, an impact modifier having a refractive index within about 0.005 units of the refractive index of the copolymer is incorporated in the multipolymer composition.

In accordance with a second aspect of the present invention, there is provided a method for improving the electrostatic charge dissipation of the methyl methacrylate copolymer comprising the step of blending the methyl methacrylate copolymer (and optionally with an impact modifier having a refractive index within about 0.005 units of the refractive index of the copolymer) with an effective amount of a polyetheresteramide having a refractive index within about 0.005 units of the refractive index of the copolymer.

In accordance with a third aspect of the present invention, there is provided a method for preparing a substantially transparent, moldable, thermoplastic multipolymer composition comprising the step of melt blending the methyl methacrylate copolymer with a polyetheresteramide having a refractive index within about 0.005 units of the refractive index of the copolymer at a temperature above the melting temperatures of the copolymer and the polyetheresteramide (and above the melting temperature of the impact modifier having a refractive index within about 0.005 units of the refractive index of the copolymer if it is included).

DETAILED DESCRIPTION OF THE INVENTION

The substantially transparent, moldable, thermoplastic multipolymer composition of the invention comprises a blend of:

(a) a methyl methacrylate copolymer of a predominant amount of methyl methacrylate and a minor amount of one or more ethylenically unsaturated monomers; and styrene, acrybonitride, methyl acrylate, ethylacrylate (b) an effective amount of a polyetheresteramide to enhance the electrostatic charge dissipation of the copolymer, said polyetheresteramide having a refractive index within about 0.005 units of the refractive index of the copolymer, such that when the composition is injection molded into a 0.125 inch thick plaque, the plaque exhibits a haze of not greater than about 25% and a light transmission of at least about 60%.

The methyl methacrylate copolymer employed in the compositions of the present invention will contain a predominant amount, e.g., about 50 to about 90 parts by weight, preferably 50 to 80 parts by weight, of methyl methacrylate and a minor amount, e.g., about 10 to about 50 parts by weight, preferably 20 to 40 parts by weight, of one or more ethylenically unsaturated monomers such as styrene, acrylonitrile, methyl acrylate, ethyl acrylate and mixtures thereof. Preferably, the ethylenically unsaturated monomer comprises a mixture of styrene and acrylonitrile or styrene and ethyl acrylate wherein the styrene is present in the copolymer in an amount of about 10 to about 40, preferably 15 to 30, parts by weight and the acrylonitrile is present in the copolymer in an amount of about 5 to about 30, preferably 5 to 20, parts by weight, based on the weight of the copolymer or the ethyl acrylate is present in the copolymer in an amount of about 3 to about 10, preferably 5 to 10 parts by weight, based on the weight of the copolymer. Such methyl methacrylate copolymers are well known in the prior art, e.g., U.S. Pat. Nos. 3,261,887; 3,354,238; 4,085,166; 4,228,256; 4,242,469; 5,061,747; and 5,290,860.

Preferably, the methyl methacrylate copolymer will have a weight average molecular weight of at least about 50,000, e.g., about 100,000 to about 300,000 and a glass transition temperature of at least about 50° C. Typically, the methyl methacrylate copolymer will have a refractive index of about 1.50 to about 1.53, preferably 1.51 to 1.52, (as measured in accordance with ASTM D-542).

The multipolymer compositions of the invention will also contain an effective amount of a polyetheresteramide to enhance the electrostatic charge dissipation of the copolymer. The polyetheresteramide should have a refractive index within about 0.005 units, preferably within 0.003 units, of the refractive index of the copolymer (as measured in accordance with ASTM D-542). Typically the polyetheresteramide will be present in the amount of about 5 to about 35, preferably 10 to 30, wt. %, based on the weight of the composition. The resultant composition when injection molded into a plaque having a thickness of 0.125 inch will be such that the plaque exhibits a haze of not greater than about 25%, preferably not greater than 15% (as measured in accordance with ASTM D-1003) and a light transmission of at least about 60%, preferably at least 80% (as measured in accordance with ASTM D-1003).

Polyetheresteramides are well known in the prior art, e.g, see U.S. Pat. Nos. 4,376,856; 4,438,240; 4,536,530; 4,689,393; 5,096,995; 5,331,061; 5,604,284; 5,652,326; and 5,886,098. Polyetheresteramides useful in preparing the composition of the present invention are commercially available from Sanyo Chemical Industries under the brand name "Pelestat" in a variety of grades having refractive indices ranging from about 1.49 to about 1.53.

The composition of the present invention may also contain a polyethylene glycol in order to improve the chemical resistance of the composition and permit the use of lower levels of the polyetheresteramide in the composition. The polyethylene glycol, if used, will have a weight average molecular weight of about 2,000 to about 10,000, preferably 3,000 to 6,000 and in an amount of about 1 to about 10 wt. %, preferably 2 to 6 wt. %, based on the weight of the copolymer plus the polyetheresteramide plus the polyethylene glycol.

Preferably, the composition of the present invention includes an impact modifier having a refractive index within about 0.005 units, preferably within 0.003 units, of the refractive index of the methyl methacrylate copolymer (as measured in accordance with ASTM D-542). Typically, the impact modifier will be present in an amount of about 2 to about 30, preferably 5 to 20 wt. %, based on the weight of the copolymer plus the polyetheresteramide plus the impact modifier.

Preferable impact modifiers for incorporation in the multipolymer compositions of the present invention include copolymers of a conjugated diene rubber grafted with one or more ethylenically unsaturated monomers as well as acrylic copolymers having a core/shell structure.

In the case where the impact modifier comprises a copolymer of the conjugated diene rubber, the rubber is preferably polybutadiene which is present in an amount of about 50 to about 90, preferably 70 to 80, parts by weight, based on the weight of the impact modifier, and the ethylenically unsaturated monomer(s) grafted onto the polybutadiene rubber is typically present in an amount of about 10 to about 50, preferably 15 to 40, parts by weight, based on the weight of the impact modifier. Typically, the ethylenically unsaturated monomer to be grafted onto the conjugated diene rubber will be a $C_1$–$C_4$ alkyl acrylate such as methyl acrylate, ethyl acrylate, propyl acrylate or butyl acrylate; a $C_1$–$C_4$ alkyl methacrylate such as methyl methacrylate, ethyl methacrylate, propyl methacrylate or butyl methacrylate; a styrene such as styrene or α-methyl styrene; a vinyl ether; a vinyl halide such as vinyl chloride; a nitrile such as acrylonitrile or methacrylonitrile; an olefin or mixtures thereof. Preferably the ethylenically unsaturated monomer(s) to be grafted onto the conjugated diene rubber comprises a monomer mixture of methyl methacrylate and styrene, with the methyl methacrylate: styrene ratio being in the range of about 2:1 to about 5:1, preferably 2.5:1 to 4.5:1.

In the case where the impact modifier comprises an acrylic copolymer having a core/shell structure, it is preferred that the core/shell structure comprises a core of a cross-linked poly(alkylmethacrylate) or a cross-linked diene rubber and a shell of a copolymer of an alkyl acrylate (e.g., methyl acrylate) and styrene. It is further preferred that the poly(alkyl-methacrylate) comprises poly(methyl methacrylate), the diene rubber comprises polybutadiene rubber and the alkyl acrylate comprises butyl acrylate. It is especially preferred that there be an additional outer shell of poly(methyl methacrylate) in addition to the shell of the alkyl acrylate/styrene copolymer.

The method of enhancing the electrostatic charge dissipation of a substantially transparent, moldable, thermoplastic methyl methacrylate copolymer comprises the step of blending the copolymer (possibly also with a polyethylene glycol and preferably also with an impact modifier) with an effective amount of a polyetheresteramide to enhance the electrostatic charge dissipation of the copolymer. The copolymer, polyethylene glycol and impact modifier (if used) and the polyetheresteramide and the amounts thereof are as described above. Preferably, the copolymer, polyethylene glycol and/or impact modifier (if used) and the polyetheresteramide are blended by melt blending the components at a temperature above the melting temperatures of the components.

The following nonlimiting examples shall serve to illustrate the invention. Unless otherwise indicated, all amounts and percentages are on a weight basis.

EXAMPLE 1

Acrylite® H15-002 was melt-blended with varying amounts of Pelestat® 7490 and the results obtained from ⅛ inch specimens injection-molded from the blend are shown in Table I. Acrylite® H15-002 is a standard grade of poly(methyl methacrylate) containing a small amount of methyl acrylate comonomer and having a refractive index of 1.491 (commercially available from Cyro Industries, Orange, Conn.). Pelestat® 7490 is a polyetheresteramide having a refractive index of 1.489 (commercially available from Sanyo Chemical Industries, Tokyo, Japan). The key physical properties of the blends are shown in Table I set forth below.

about 10 wt. % acrylonitrile and had a refractive index of 1.515. The impact modifier consisted of 75 wt. % polybutadiene rubber grafted with 25 wt. % of a monomer mixture

TABLE I

| | | | | | |
|---|---|---|---|---|---|
| Acrylite ® H15-002, wt. % | 100 | 95 | 90 | 85 | 80 |
| Pelestat ® 7490, wt. % | 0 | 5 | 10 | 15 | 20 |
| Transmission, % | 93.1 | 89.5 | 87.1 | 85.5 | 81.6 |
| Y-Haze, % | 0.5 | 10.6 | 22.4 | 29.5 | 51.9 |
| Yellowness Index | 0.3 | 5.2 | 7.6 | 8.1 | 10.4 |
| Tensile Strength, psi | 11200 | 9700 | 8300 | 7800 | 6400 |
| Elongation @ yield, % | 4.9 | 4.7 | 4.1 | 3.9 | 3.7 |
| Elongation @ break, % | 13.0 | 11.8 | 24.0 | 17.2 | 10.4 |
| Tensile Modulus, psi | 491100 | 453000 | 406000 | 383000 | 324000 |
| Notched Izod, fppi | | | | | |
| @ ¼ in @ room temp. | 0.3 | 0.3 | 0.5 | 0.5 | 0.5 |
| @ ⅛ in @ room temp. | 0.3 | 0.3 | 0.5 | 0.5 | 0.7 |
| DTL @ 264 psi, ° C. | 96.6 | 93.9 | 92.6 | 92.2 | 92.1 |
| Vicat, ° C. | 109.5 | 108.0 | 108.1 | 108.7 | 108.9 |
| Melt Index g/10 min 230° C./5.0 kg | 2.7 | 4.4 | 8.1 | 10.7 | 23.2 |
| Lipid Resistance (Exposed for 24 hrs @ 30° C. under 1.2% strain) | | | | | |
| Tensile Strength, psi | 7400 | 7700 | 7300 | 6700 | 4700 |
| Elongation @ yield, % | 1.5 | 1.9 | 2.3 | 2.1 | 1.7 |
| Elongation @ break, % | 1.5 | 1.9 | 2.3 | 2.1 | 1.7 |
| Tensile Modulus, psi | 592000 | 558000 | 464000 | 439000 | 360000 |
| Visual Observation | No effect | No effect | No effect | No effect | No effect |
| Retention % After Lipid Exposure | | | | | |
| Tensile Strength | 66 | 79 | 88 | 86 | 73 |
| Elongation @ break | 12 | 16 | 10 | 12 | 16 |
| Tensile Modulus | 121 | 123 | 114 | 115 | 111 |
| Isopropanol @ 5 hrs. (0.9% strain/20° C.) | | | | | |
| Tensile Strength. psi | | | | 3200 | 6500 |
| Elongation @ yield, % | | | | 0.9 | 3.3 |
| Elongation @ break, % | | | | 0.9 | 7.3 |
| Tensile Modulus, psi | | | | 363000 | 384000 |
| Visual Observation | fractured in <15 min | fractured in <30 min. | fractured in <45 min. | slight edge craze after 5 hrs. | no effect after 5 hrs. |
| Retention % After Isopropanol Exposure | | | | | |
| Tensile Strength | 0 | 0 | 0 | 41 | 102 |
| Elongation @ break | 0 | a | 0 | 5 | 70 |
| Tensile Modulus | 0 | 0 | 0 | 95 | 119 |

EXAMPLE 2

A copolymer of methyl methacrylate with about 5 wt. % polyethylene glycol (referred to as "PEG" in Table II) having a weight average molecular weight of about 5,000 and without any polyethylene glycol was melt-blended with an impact modifier and with varying amounts of Pelestat® 6321, a polyetheresteramide having a refractive index of 1.512 (commercially available from Sanyo Chemical Industries, Tokyo, Japan). The copolymer (XT-375® available from Cyro Industries, Orange, Conn.) contained about 70 wt. % methyl methacrylate, about 20 wt. % styrene and about 10 wt. % acrylonitrile and had a refractive index of 1.515. The impact modifier consisted of 75 wt. % polybutadiene rubber grafted with 25 wt. % of a monomer mixture of methyl methacrylate and styrene in a ratio of 3:1. The impact modifier had a refractive index of 1.515 and was used in an amount of about 1 part to about 8 parts of the copolymer. The combination of the copolymer (with and without polyethylene glycol) and the impact modifier had a refractive index of 1.515 and is referred to in Table II below. The melt-blended components were injection molded into ⅛ inch tensile bars and tested as set forth in Table II before and after exposure to stress in the presence of lipids and isopropanol.

TABLE II

| | | | | | |
|---|---|---|---|---|---|
| XT-375 ®, wt % | 100 | 95 | 90 | 87.5 | 75 |
| PEG, wt. % | 0 | 5 | 5 | 5 | 0 |
| Pelestat ® 6321, wt. % | 0 | 0 | 5 | 7.5 | 25 |
| Initial Properties | | | | | |
| Tensile Strength, psi | 8180 | 6920 | 6960 | 6680 | 4460 |
| Elongation @ break, % | 9.8 | 3.5 | 6.8 | 3.5 | 19.6 |
| Lipid Resistance (Exposed for 24 hrs @ 30° C. under 1.2% strain) | | | | | |
| Tensile Strength, psi | 6210 | 6300 | 6490 | 6420 | 4350 |

TABLE II-continued

| | | | | | |
|---|---|---|---|---|---|
| Elongation @ break, % | 11.9 | 2.4 | 2.3 | 49 | 17.6 |
| Tensile Strength Retention, % | 75.9 | 91.0 | 93.2 | 96.1 | 97.5 |
| Elongation @ break Retention, % | 121.4 | 68.6 | 33.3 | 140.0 | 89.8 |
| Visual Observation | No effect | No effect | No effect | No effect | No effect |
| Isopropanol @ 5 hrs. (0.9% strain/20° C.) | | | | | |
| Tensile Strength. psi | 2630 | | 2230 | 6750 | 4330 |
| Elongation @ break, % | 0.6 | | 0.9 | 4.9 | 22.1 |
| Tensile Strength Retention, % | 32.2 | | 32.0 | 86.1 | 97.1 |
| Elongation @ break, Retention, % | 6.1 | | 13.0 | 140.0 | 112.8 |
| Visual Observation | Severe crazing | Fractured within 4.5 hrs | Slight edge craze | Moderate edge craze | No effect |

EXAMPLE 3

Example 2 was repeated using the same methyl methacrylate copolymer (without any PEG), impact modifier and varying amounts of Pelestat® 6321. The components were melt-blended and thereafter injection molded into ⅛ inch specimens. The key physical and electrical properties of such specimens are set forth in Table III below.

TABLE III

| | | | | | |
|---|---|---|---|---|---|
| XT-375 ®, wt % | 100 | 90 | 85 | 80 | 75 |
| Pelestat ® 6321, wt. % | 0 | 10 | 15 | 20 | 25 |
| Transmission, % | 84 | 83 | 81 | 76 | 74 |
| Y-Haze, % | 13.7 | 4.9 | 7.5 | 8.3 | 8.6 |
| Yellowness Index | −0.6 | 11.7 | 12.4 | 25.6 | 28.5 |
| Tensile Strength, psi | 10070 | 7270 | 6930 | 5750 | 5050 |
| Elongation @ yield, % | 3.3 | 3.4 | 3.4 | 3.6 | 4.6 |
| Elongation @ break, % | 11.2 | 14 | 36.9 | 22.6 | 19.3 |
| Tensile Modulus, psi | 465000 | 364000 | 311000 | 265000 | 228000 |
| Notched Izod, fppi | | | | | |
| @ ¼ in @ room temp | 2.4 | 1.3 | 1.7 | 1.1 | 0.8 |
| @ ⅛ in @ room temp | 2.2 | 1.8 | 1.5 | 1.2 | 1.1 |
| DTL @ 264 psi, ° C. | 91 | 85 | 86 | 86 | 85 |
| Vicat, ° C. | 104 | 104 | 104 | 104 | 105 |
| Melt Index, g/10 min @ 230° C./5.0 kg | 3.2 | 4.3 | 5.1 | 7.1 | 9.5 |
| Surface Resistivity, ohms/sq. | | | | | |
| @ 0% relative humidity | >1 × $10^{14}$ | 4 × $10^{12}$ | 3 × $10^{11}$ | 1 × $10^{11}$ | 4 × $10^{10}$ |
| @ 27% relative humidity | | 3 × $10^{11}$ | 4 × $10^{10}$ | 1 × $10^{10}$ | 1 × $10^{10}$ |
| @ 43% relative humidity | | 1 × $10^{11}$ | 1 × $10^{10}$ | 1 × $10^{10}$ | 3 × $10^{9}$ |
| @ 66% relative humidity | | 2 × $10^{10}$ | 2 × $10^{9}$ | 1 × $10^{9}$ | 1 × $10^{9}$ |
| @ 93% relative humidity | >1 × $10^{14}$ | 2 × $10^{8}$ | 1 × $10^{8}$ | 1 × $10^{8}$ | 4 × $10^{7}$ |
| Cut-Off @ relative humidity, % | | 12 | 0 | 0 | 0 |

The following conclusions may be drawn from the data set forth in Tables I–III: As may be seen from Table I, the haze increases rapidly and the transmission decreases rapidly as the result of incorporation of increasing amounts of a polyetheresteramide in a standard grade of poly(methyl methacrylate). Such result is believed to have occurred because, as more polyetheresteramide is added, bigger particles of the polyetheresteramide are formed in the poly(methyl methacrylate) matrix which results in greater light scattering and hence greater haze. Such result occurred even though the refractive index of the polyetheresteramide is 1.489 which is very close to that of the poly(methyl methacrylate) at 1.491(a difference of only 0.002 units). It therefore appears that the polyetheresteramide was incompatible with the poly(methyl methacrylate).

As may be seen from Tables II and III, there is good inherent compatibility between the acrylic-based copolymer (refractive index of 1.515), the impact modifier (refractive index of 1.515) and the polyetheresteramide (refractive index of 1.512). This is apparent when the elongation @ break (which is a measure of the toughness of the composition) of the poly(methyl methacrylate)+polyetheresteramide composition in Table I is compared to that of the acrylic-based copolymer+impact modifier+polyetheresteramide compositions in Tables II and III. The compositions in Table I exhibit substantially no improvement in elongation @ break at the 20% polyetheresteramide level, while the compositions in Tables II and III show a doubling of the elongation @ break at the 20% polyetheresteramide level.

The enhanced effect in respect to chemical resistance to fats and to isopropyl alcohol associated with the compositions in Table II versus that of the compositions in Table I is also indicative of compatibility of the components of the compositions in Table II.

As may be seen from Table II, the inclusion of polyethylene glycol in the resin composition produces a beneficial effect as regards the physical properties of the compositions. This may be advantageous since the polyethylene glycol is a cheaper component than the polyetheresteramide and its presence may therefore result in a need for a lesser amount of the polyetheresteramide to produce an acceptable level of physical properties.

As may be seen from Table III, increasing amounts of the polyetheresteramide resulted in significant decreases in surface resistivities of the compositions without producing any significant adverse effects on the physical properties of the compositions.

EXAMPLE 4

Cyrolite® G20-100 was melt-blended with varying amounts Pelestat® 6321NC (referred to as "PST" in Table IV) and the results in respect to isopropanol(referred to as "IPA" in Table IV) retention and lipid retention percentages from ⅛ inch tensile specimens injection-molded from the blends are shown in Table IV below. Cyrolite® G20-100 is a copolymer similar in composition to the copolymer employed in Example 2, except that ethyl acrylate rather than acrylonitrile was used as the third monomer and has a refractive index of 1.515 and is commercially available from Cyro Industries, Orange, Conn. The impact modifier blended with the copolymer was the same as that employed in Example 2 and was present in an amount of about 1 part to about 7 parts of the copolymer. The Pelestat® 6321NC is the same type of polyetheresteramide as that employed in Example 2, except that it is a cleaner grade and contains less residual chlorine. Several of the samples were also blended with about 5 wt. % of the same polyethylene glycol (referred to as "PEG" in Table IV) as that employed in Example 2. The control was Cyrolite® CG97 which is the same copolymer as Cyrolite® G20-100 except that it contained about 1 part of impact modifier per 3 parts of the copolymer and it also contained about 3 wt. % PEG and a small amount of "BHT", an anti-oxidant.

mer of methyl methacrylate, styrene and acrylonitrile (the results of which are shown in Table II).

What is claimed is:

1. A substantially transparent, moldable, thermoplastic composition for use in the preparation of a transparent sheet product comprising:
   a) a methyl methacrylate copolymer of a predominant amount of methyl methacrylate and a minor amount of one or more ethylenically unsaturated monomers; and
   b) a polyetheresteramide, present in an amount of about 5% to about 35% of the total weight of the composition, to enhance the electrostatic charge dissipation of the copolymer, said polyetheresteramide having a refractive index within about 0.005 units of the refractive index of the copolymer,
   such that when the composition is injection molded into a 0.125 inch thick plaque, the plaque exhibits a haze of not greater than about 25% and a light transmission of at least about 60%.

2. The composition of claim 1 wherein the plaque exhibits a haze not greater than 15% and a light transmission of at least 80%.

3. The composition of claim 2 wherein the polyetheresteramide is present in an amount of 10 to 30 wt. %, based on the weight of the composition.

4. The composition of claim 1 wherein the polyetheresteramide has a refractive index within 0.003 units of the refractive index of the copolymer.

5. The composition of claim 1 wherein the methyl methacrylate is present in the copolymer in an amount of about 50 to about 90 parts by weight, based on the weight of the copolymer.

TABLE IV

| Composition | CG97 | G20-100 + 10 wt. % PST | G20-100 + 12.5 wt. % PST | G20-100 + 15 wt. % PST | G20-100 + 10 wt. % PST + 5 wt. % PEG | G20-100 + 12.5 wt. % PST + 5 wt. % PEG | G20-100 + 15 wt. % PST + 5 wt. % PEG |
|---|---|---|---|---|---|---|---|
| IPA Retention, % | | | | | | | |
| Tensile Strength | 0 | 97 | 98 | 97 | 119 | 100 | 98 |
| Elongation @ break | 0 | 92 | 96 | 97 | 100 | 74 | 73 |
| Lipid Retention, % | | | | | | | |
| Tensile Strength | 100 | 91 | 98 | 97 | 115 | 96 | 93 |
| Elongation @ break | 177 | 92 | 56 | 78 | 162 | 83 | 42 |

As may be seen from the results in Table IV above, composition CG-97 (the control) failed in isopropanol retention in respect to tensile strength as well as elongation @ break. In contrast thereto, the G20-100 compositions containing Pelestat® 6321NC exhibited very high isopropanol retention as to tensile strength and elongation @ break. The presence of 5 wt. % polyethylene glycol also appeared to improve the isopropanol retention, particularly at the 10 wt. % Pelestat® 6321NC level.

In respect to lipid retention, composition CG97 (the control) exhibited good levels of tensile strength and elongation @ break. As the level of Pelestat® 6321NC in the G20-100 compositions increased, there was only a slight diminution of tensile strength and elongation @ break. At the 10 wt. % Pelestat® 6321NC and 5 wt. % polyethylene glycol levels, the tensile strength and elongation @ break of the G20-100 composition compared favorably to that of the CG97.

The results in Table IV show that the use of the Pelestat® 6321 NC and in some cases, also the addition of polyethylene glycol is beneficial to a copolymer of methyl methacrylate, styrene and ethyl acrylate as well as a copoly- 6. The composition of claim 5 wherein the methyl methacrylate is present in the copolymer in an amount of 50 to 80 parts by weight, based on the weight of the copolymer.

7. The composition of claim 1 wherein said one or more ethylenically unsaturated monomers are present in the copolymer in an amount of about 10 to about 50 parts by weight, based on the weight of the copolymer.

8. The composition of claim 7 wherein said one or more ethylenically unsaturated monomers are present in the copolymer in an amount of 15 to 40 parts by weight, based on the weight of the copolymer.

9. The composition of claim 1 wherein the ethylenically unsaturated monomer is selected from the group consisting of styrene, acrylonitrile, methyl acrylate, ethyl acrylate and mixtures thereof.

10. The composition of claim 7 wherein the ethylenically unsaturated monomer comprises a mixture of styrene and acrylonitrile.

11. The composition of claim 10 wherein the styrene is present in the copolymer in an amount of about 10 to about 40 parts by weight and the acrylonitrile is present in the copolymer in an amount of about 5 to about 30 parts by weight, based on the weight of the copolymer.

12. The composition of claim 10 wherein the styrene is present in the copolymer in an amount of 15 to 30 parts by weight and the acrylonitrile is present in the copolymer in an amount of 5 to 20 parts by weight, based on the weight of the copolymer.

13. The composition of claim 7 wherein the ethylenically unsaturated monomer comprises a mixture of styrene and ethyl acrylate.

14. The composition of claim 13 wherein the styrene is present in the copolymer in an amount of about 10 to about 40 parts by weight and the ethyl acrylate is present in the copolymer in an amount of about 3 to about 10 parts by weight, based on the weight of the copolymer.

15. The composition of claim 14 wherein the styrene is present in the copolymer in an amount of 15 to 30 parts by weight and the ethyl acrylate is present in the copolymer in an amount of 5 to 10 parts by weight, based on the weight of the copolymer.

16. The composition of claim 1 further including a polyethylene glycol having a weight average molecular weight of about 2,000 to about 10,000 in an amount of about 2 to about 10 wt. %, based on the weight of the copolymer plus the polyetheresteramide plus the polyethylene glycol.

17. The composition of claim 16 wherein the polyethylene glycol has a weight average molecular weight of 3,000 to 6,000 and is present in an amount of 3 to 6 wt. %, based on the weight of the copolymer plus the polyetheresteramide plus the polyethylene glycol.

18. The composition of claim 1 further including an impact modifier having a refractive index within about 0.005 units of the refractive index of the copolymer.

19. The composition of claim 18 wherein the impact modifier has a refractive index within 0.003 units of the refractive index of the copolymer.

20. The composition of claim 18 wherein the impact modifier is present in the amount of about 2 to about 30 wt. %, based on the weight of the copolymer plus the polyetheresteramide plus the impact modifier.

21. The composition of claim 20 wherein the impact modifier is present in the amount of 5 to 20 wt. %, based on the weight of the copolymer plus the polyetheresteramide plus the impact modifier.

22. The composition of claim 18 wherein the impact modifier comprises a copolymer selected from the group consisting of a conjugated diene rubber grafted with one or more ethylenically unsaturated monomers and an acrylic copolymer having a core/shell structure.

23. The composition of claim 22 wherein the impact modifier comprises polybutadiene rubber grafted with one or more ethylenically unsaturated monomers.

24. The composition of claim 24 wherein the polybutadiene rubber is present in the amount of about 50 to about 90 parts by weight, based on the weight of the impact modifier.

25. The composition of claim 24 wherein the polybutadiene rubber is present in the amount of 70 to 80 parts by weight, based on the weight of the impact modifier.

26. The composition of claim 23 wherein the ethylenically unsaturated monomer grafted onto the conjugated diene rubber is present in the amount of about 10 to about 50 parts by weight, based on the weight of the impact modifier.

27. The composition of claim 26 wherein the ethylenically unsaturated monomer grafted onto the conjugated diene rubber is present in the amount of 15 to 40 parts by weight, based on the weight of the impact modifier.

28. The composition of claim 23 wherein the ethylenically unsaturated monomer grafted onto the rubber is selected from the group consisting of a $C_1$–$C_4$ alkyl acrylate, a $C_1$–$C_4$ alkyl methacrylate, a styrene, a vinyl ether, a vinyl halide, a nitrile, an olefin and mixtures thereof.

29. The composition of claim 28 wherein the ethylenically unsaturated monomer grafted onto the rubber is selected from the group consisting of styrene, α-methyl styrene, methyl acrylate, ethyl acrylate, propyl acrylate, butyl acrylate, methyl methacrylate, ethyl methacrylate, propyl methacrylate, butyl methacrylate, acrylonitrile and methacrylonitrile.

30. The composition of claim 29 wherein the ethylenically unsaturated monomer grafted onto the rubber comprises a monomer mixture.

31. The composition of claim 30 wherein the monomer mixture comprises methyl methacrylate and styrene.

32. The composition of claim 31 wherein the ratio of the methyl methacrylate to the styrene in the monomer mixture is in the range of about 2:1 to about 4:1.

33. The composition of claim 32 wherein the ratio of the methyl methacrylate to the styrene in the monomer mixture is in the range of 2.5:1 to 3.5:1.

34. The composition of claim 22 wherein the acrylic copolymer having a core/shell structure comprises a core of a cross-linked poly(alkylmethacrylate) or a cross-linked diene rubber and a shell of a copolymer of an alkyl acrylate and styrene.

35. The composition of claim 34 wherein the poly(alkylmethacrylate) comprises poly(methyl methacrylate), the diene rubber comprises polybutadiene rubber and the alkyl acrylate comprises butyl acrylate.

36. The composition of claim 34 further including an outer shell of poly(methyl methacrylate).

37. A method of enhancing the electrostatic charge dissipation of a substantially transparent, moldable, thermoplastic methyl methacrylate copolymer of a predominant amount of methyl methacrylate and a minor amount of one or more ethylenically unsaturated monomers which comprises the step of blending the copolymer with an effective amount of a polyetheresteramide to enhance the electrostatic charge dissipation of the copolymer, said polyetheresteramide having a refractive index within about 0.005 units of the refractive index of the copolymer, such that when the resultant blend of the copolymer and the polyetheresteramide is injection molded into a plaque having a thickness of 0.125 inch, the plaque exhibits a haze of not greater than about 25% and a light transmission of at least about 60%.

38. The method of claim 37 wherein the blending is carried out by melt blending the copolymer and the polyetheresteramide at a temperature above the melting temperatures of the copolymer and the polyetheresteramide.

39. The method of claim 38 wherein the polyetheresteramide is present in an amount of about 5 to about 35 wt. %, based on the weight of the copolymer plus the polyetheresteramide.

40. The method of claim 39 wherein the copolymer and the polyetheresteramide are blended with a polyethylene glycol having a weight average molecular weight of about 2,000 to about 10,000 in an amount of about 2 to about 10 wt. %, based on the weight the copolymer plus the polyetheresteramide plus the polyethylene glycol.

41. A method of enhancing the electrostatic charge dissipation of a substantially transparent, moldable, thermoplastic methyl methacrylate copolymer of a predominant amount of methyl methacrylate and a minor amount of one or more ethylenically unsaturated monomers which comprises the step of blending the copolymer with an impact modifier and an effective amount of a polyetheresteramide to enhance the electrostatic charge dissipation of the copolymer, said impact modifier having a refractive index within about 0.005 units of the refractive index of the copolymer and said polyetheresteramide having a refractive index within about 0.005 units of the refractive index of the copolymer, such that when the resultant blend of the copolymer, impact modifier and the polyetheresteramide is injection molded into a plaque having a thickness of 0.125 inch, the plaque exhibits a haze of not greater than about 25% and a light transmission of at least about 60%.

42. The method of claim 41 wherein the blending is carried out by melt blending the copolymer, impact modifier and the polyetheresteramide at a temperature above the melting temperatures of the copolymer, impact modifier and the polyetheresteramide.

43. The method of claim 42 wherein the impact modifier is present in an amount of about 2 to about 30 wt. %, based on the weight of the copolymer plus the polyetheresteramide plus the impact modifier.

* * * * *